United States Patent Office 3,146,374
Patented Aug. 25, 1964

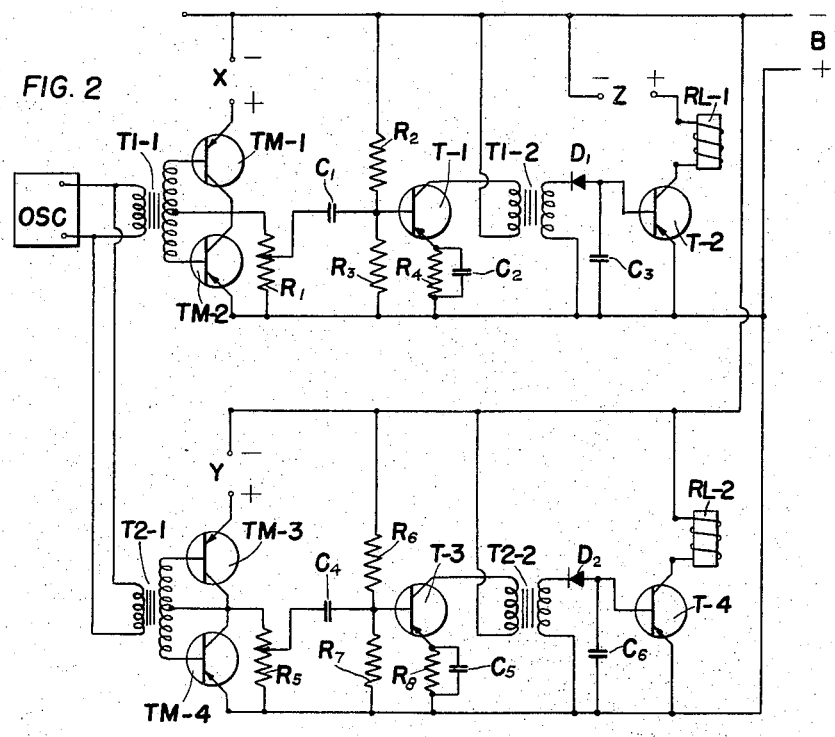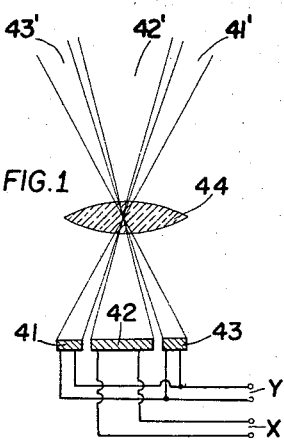

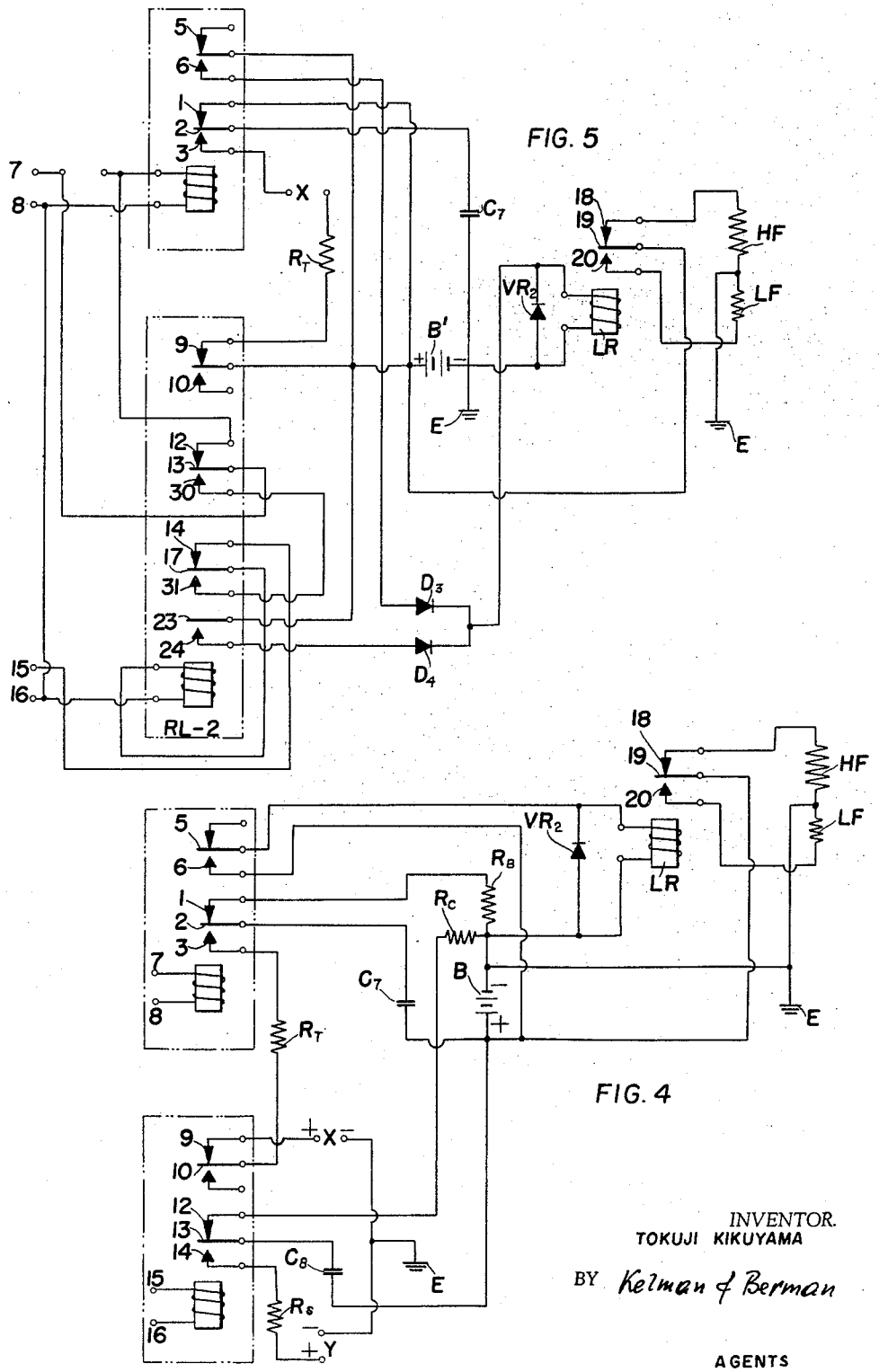

3,146,374
AUTOMATIC HEADLIGHT CONTROL
Tokuji Kikuyama, 2–17 Tosei-cho, Showa-ku,
Nagoya, Japan
Filed July 7, 1960, Ser. No. 41,355
Claims priority, application Japan July 11, 1959
4 Claims. (Cl. 315—83)

This invention relates to automatic controls for automotive headlights.

The invention is more particularly concerned with a motor-vehicle headlight-control system responsive to an oncoming light beam from an approaching vehicle to reduce the intensity of the light beam of the connected headlight so as to prevent blinding of the driver of the oncoming vehicle, yet adapted to restore the intensity of the headlights after the other car has passed so as to fully illuminate the road behind the other vehicle.

Known headlight-control systems include a light sensitive element in circuit with a main headlight and an auxiliary headlight in such a manner that the normally energized main headlight is disconnected from its current source and the auxiliary headlight is connected thereto, when the light beam of an approaching vehicle falls on the element. It is a short-coming of a known type of control-system that the switch-over of headlights is again reversed if the intensity of the light incident on the photosensitive element is reduced as by a changeover from main to auxiliary headlights in the approaching vehicle, or if alignment between the light beam of the approaching vehicle and the element is lost by jolting of one of the vehicles. The undesirable reversal may be instantaneous or it may be delayed by a time-delay device. Conventional control systems equipped with time-delay devices may have the additional disadvantage that return to main headlights may be delayed unduly after the other vehicle has been passed so that the road immediately behind the passed vehicle is not safely illuminated.

In one of its more specific aspects, the invention contemplates the use of two light sensing units, the first unit being arranged to sense light coming from a distant approaching vehicle, and the second unit being aimed at the vehicle as it passes by. A light relay is moved into an operative position by the first unit responsive to the sensed light, and is released from that position by the second unit. The light relay selectively connects a high beam or main headlight or a low beam or auxiliary headlight to a source of current.

The first sensing unit includes a photosensitive detector which when actuated by the incident light of the appoaching vehicle emits electric current. A first control circuit is energized by the actuated first sensing unit to disconnect the main headlight from its source of current by means of the afore-mentioned light relay, and to connect the auxiliary headlight thereto when the incident light reaches a predetermined intensity. A holding circuit in the first control circuit prevents return to the main headlight connection in the event of fluctuations in the intensity of the incident light.

When the approaching vehicle passes by and the light incident on a photosensitive detector in the second sensing unit reaches a certain intensity, the aforementioned holding circuit is interrupted. The first control circuit thereby returns the light relay to its initial inoperative position, and the main headlight is again connected to its source of current if the intensity of the light incident on the first photosensitive detector is below a limiting intensity.

In another aspect of this invention, the second light sensing unit may be omitted, and the headlight control system may be arranged to become ready for return to the inoperative position of the light relay when the light incident on the single first sensing unit exceeds a predetermined intensity.

The exact nature of this invention as well as other objects and advantages thereof will be readily apparent from consideration of the following specifications relating to the annexed drawing in which:

FIG. 1 shows the working elements of a photo-electric detector arrangement of the invention in a sectional view taken on the optical axis of the arrangement;

FIG. 2 is a schematic of an amplifier arrangement actuated by the detector arrangement of FIG. 1 to control respective relays;

FIG. 3 is a schematic of a manual switch arrangement for auxiliary control of the amplifier arrangement of FIG. 2;

FIG. 4 is the wiring diagram of a first embodiment of relay circuits controlled by the relays partly illustrated in FIG. 2; and FIG. 5 is the wiring diagram of a second embodiment of relay circuits controlled by the relays partly illustrated in FIG. 2.

Referring now to the drawing in detail, and initially to FIG. 1, there is seen the photosensitive detector arrangement of a preferred embodiment of the invention. Three photoelectric cells 41, 42, 43 are juxtaposed in the focal plane of a lens 44. When the axis of the lens 44 is horizontal, light originating in a central sector 42' ahead of the lens 44 falls on the photoelectric cell 42. Light originating in the sectors 43', 41' to the left and right respectively of the sector 42' falls on the cells 41 and 43. The cell 42 has terminals X, and the cells 41, 43 are connected in parallel to terminals Y.

FIG. 2 diagrammatically shows the relay actuating amplifier portions of the first and second control circuits of the invention which are respectively connected to the terminals X and Y of the photoelectric cells of FIG. 1. The two amplifiers are conected to a common local audio frequency oscillator OSC, and to a common direct current power supply B. The two amplifier portions are wired in substantially the same manner. In the following description of the first amplifier, circuit elements of the second amplifier are referred to in parentheses after corresponding features of the first amplifier.

Each amplifier has a push-pull modulator section. The primary winding of the input transformer T1–1 (T2–1) of the modulator section is connected to the oscillator OSC. The center-tapped secondary winding is connected to the bases and collectors of two transistors TM–1, TM–2 (TM–3, TM–4) in a conventional manner. The output terminals X (Y) of the photoelectric cell 42 (41, 43) are inserted in the emitter lead of the transistor TM–1 (TM–3).

The modulator section is coupled by a capacitor $C_1$ ($C_4$) and resistor $R_1$ ($R_5$) to an amplification section having a transistor T–1 (T–3) which is temperature compensated by resistors $R_2$, $R_3$, $R_4$, and a capacitor $C_2$ ($R_6$, $R_7$, $R_8$, $C_5$). The output of the amplification section is fed to a rectifier section by a transformer T1–2 (T2–2). The output current of the transformer is rectified by a diode $D_1$ ($D_2$), smoothed by a capacitor $C_3$ ($C_6$), and fed to a transistor T–2 (T–4) which provides amplified direct current to the coil of a control relay RL–1 (RL–2).

Terminals Z in the return lead of the relay RL–1 are connected to a double-pole switch assembly 45 schematically shown in FIG. 3. In the illustrated normal position of the switch assembly, the terminals Z are connected through a varistor $VR_1$. When the actuating member 46 of the switch assembly is moved in the direction of the arrow H, a movable contact member 47 is released from a corresponding fixed member, the circuit of the first amplifier is interrupted at the terminals Z, and the relay RL–1 is deenergized. When the actuating member 46 is moved in the direction of the arrow L, a movable contact member 48 closes a circuit between the input terminals X of the first amplifier through a resistor $R_A$.

The photosensitive detector arrangement of FIG. 1 and the amplifier portions shown in FIG. 2 are basically common to the several embodiments of the invention which will be described hereinafter.

The first embodiment of the headlight control system of the invention includes relay circuits diagrammatically illustrated in FIG. 4. The relay coil RL–1 which is connected to the first amplifier circuit of FIG. 2 by its terminals 7, 8 cooperates with an armature carrying movable contacts 2 and 5. The contact 2 normally closes a circuit with a fixed contact 1, and switches to another fixed contact 3 when the relay coil RL–1 is energized. The movable contact 5 is part of a normally open switch having a fixed contact 6.

The relay coil RL–2 is connected to the second amplifier by its terminals 15, 16. It actuates a normally closed switch having contacts 9 and 10, and a movable contact 13 normally abutting against a fixed contact 12, and closing a circuit with a fixed contact 14 when the coil RL–2 is energized.

The high-beam filament HF of a main headlight has one grounded terminal and another terminal connected to a fixed contact 18 of a light relay LR. The movable contact 19 of the light relay normally connects the fixed contact 18 to the positive pole of the power supply battery B. The negative pole of the battery is grounded so that the main headlight filament HF is normally energized. When the relay coil LR attracts its armature, the movable contact 19 is disconnected from the high beam filament HF and engages a fixed contact 20 of a low beam filament LF of an auxiliary headlight whose other terminal is grounded.

The relay coil LR is interposed in circuit between the movable contact 5 of the relay RL–1 and the grounded battery pole. A varistor $VR_2$ is shunted across the light relay LR. The fixed contact 6 of the relay RL–1 is connected to the positive battery pole.

The fixed contact 1 of the relay RL–1 is grounded through a load-limiting resistor $R_B$. A capacitor $C_7$ is interposed between the movable relay contact 2 and the positive battery pole. A resistor $R_T$ connects the relay contacts 3 and 10.

Relay contact 9 is connected to the first amplifier input terminal X. Relay contact 12 is grounded through a load limiting resistor $R_C$. A capacitor $C_8$ is interposed between the contact 13 and the positive pole of the battery B. The contact 14 is connected to the second amplifier input Y through a resistor $R_S$.

In the illustrated normal position of the relays RL–1 and RL–2, the capacitors $C_7$, $C_8$ are being charged by the battery B through respective load limiting resistors $R_B$, $R_C$. When the relays RL–1 and RL–2 are energized, the capacitor charges are fed to the amplifier inputs X and Y respectively during a period which may be controlled by selecting resistors $R_S$, $T_T$ of suitable value. The capacitor $C_7$ and the coordinated resistor $R_T$ will hereinafter be referred to as the first time-delay means, while the capacitor $C_8$ and resistor $R_S$ constitute second time-delay means. It is apparent that the time-delay means actuate the respective amplifiers regardless of the condition of the corresponding photoelectric cells, and thus provide holding circuits which respectively include the holding contacts 2, 3 and 13, 14.

The headlight control system of the invention equipped with the relay circuits of FIG. 4 operates as follows:

When another car approaches a vehicle equipped with the afore-described apparatus, the headlight beam of the other car enters the lens 44 from the sector 42' and is therefore focussed on the photoelectric cell 42. The resulting output of the cell is fed at X to the amplifier of the first control circuit, whereby the coil of the relay RL–1 is energized. The coil attracts its armature.

Closing of the switch 5, 6 energizes the light relay LR. The movable contact 19 is switched from the fixed contact 18 to the fixed contact 20. The high-beam filament HF of the main headlight is disconnected from the battery B, and the low-beam filament LF of the auxiliary headlight is connected thereto. The headlights of the controlled car are dimmed.

The movable contact 2 is simultaneously switched from the contact 1 of the capacitor charging circuit to the contact 3 of the holding circuit. While this circuit is closed, the output current of the first amplifier keeps the coil RL–1 energized until the charge of the capacitor $C_7$ is spent, regardless of the intensity of the light incident on the cell 42.

The relative movement of the cars towards each other in parallel but laterally offset paths causes the source of incident light to move from the sector 42' to the sector 43' if the car travels on the right side of the road, and to the sector 41' if the cars travel on the left road side. The output of the photocell 42 drops to an inoperative value, and the second amplifier is energized by voltage applied to its input terminal Y by one of the cells 41, 43. The coil of the relay RL–2 therefore attracts its armature.

The switch 9, 10 in the holding circuit of the first control relay RL–1 is opened. Since the output of the photocell 42 is no longer sufficient to energize the first amplifier, the relay RL–1 releases its armature. The energizing circuit of the light relay LR is interrupted between contacts 5 and 6, and the light current from the battery B is again fed to the high-beam filament HF of the main headlight.

The second holding circuit including the time-delay capacitor $C_8$ is closed between the contacts 13, 14 as the light beam from the passing vehicle falls on one of the cells 41, 43. The second holding circuit is preferably so designed as to have a discharge time of less than one second. When the capacitor $C_8$ is discharged, the relay RL–2 is deenergized, the movable contacts 10 and 13 return to their normal position, and the headlight control system is again in the condition illustrated in FIG. 4.

The relay circuits of another embodiment of the invention are illustrated by the diagram of FIG. 5, and will be understood to cooperate with the photosensitive detector arrangement shown in FIG. 1 through the amplifier portions of the control circuits shown in FIG. 2. The output terminals of the two amplifiers are respectively connected to the terminals 7, 8 and 15, 16 connected to two relay coils RL–1 and RL–2.

A fixed contact 6 and a movable contact 5 form a normally open switch which is closed when the coil RL–1 is actuated. The movable contact 2 normally closes a circuit with a fixed contact 1 and switches to another fixed contact 3 when the coil RL–1 is energized.

The relay coil RL–2 operates four movable contacts 10, 13, 17, and 23. The contact 10 forms a normally closed circuit with a fixed contact 9. The contact 13 normally closes a circuit with a fixed contact 12, and is switched over to another fixed contact 30 when the coil RL–2 attracts its armature. The contact 17 similarly normally cooperates with a fixed contact 14, and is switched to another fixed contact 31 by the coil RL–2. The contact 23 forms a normally open switch with a fixed contact 24.

A light relay LR when energized moves a movable contact 19 from a fixed contact 18 to a fixed contact 20. The contacts 18 and 20 are connected to respective terminals of the high beam filament HF of a main headlight and the low beam filament LF of an auxiliary headlight. The other terminals of these filaments are grounded. A varistor $VR_2$ is shunted across the light relay coil LR which has one grounded terminal.

The movable contacts 5, 10, 23, and 19 and the fixed contact 1 are directly connected to the positive pole of a battery B′ whose negative pole is grounded. The fixed contacts 6 and 24 are connected through respective diodes $D_3$ and $D_4$ with the other terminal of the light relay coil LR. The movable contact 2 is grounded through a time delay capacitor $C_7$.

The fixed contact 3 is connected to one amplifier input terminal X, whereas the other amplifier input terminal is connected to the fixed contact 9 through a resistor $R_T$. One lead of the relay coil RL–1 normally passes through the contacts 12, 13. The fixed contacts 30, 31 are connected by a conductor. The contacts 14, 17 are interposed between the coil RL–2 and its terminal 15. The relay coil terminals 8 and 15 are connected.

The relay arrangement shown in FIG. 5 operates as follows:

When the headlight of an approaching vehicle causes the control relay RL–1 to be energized, current is passed through the light relay LR by way of the contacts 5, 6 and the diode $D_3$. The main headlight is extinguished, and the auxiliary headlight is turned on as described hereinbefore. Simultaneously, the capacitor $C_7$ is disconnected from its charging circuit with the battery B′ and gradually releases its charge through the time delay resistor $R_T$ and the input terminals X of the first amplifier to provide a temporary holding arrangement for the first control relay RL–1 as long as the relay R1–2 is inactive.

When the approaching car comes nearer, its headlight beam also falls on the photoelectric cells 41 or 43, the second amplifier is energized and the second control relay RL–2 attracts its armature. A circuit is closed from the terminal 7 of the first amplifier through the contacts 13, 30, 31, 17 and the second relay coil RL–2 to the terminals 16 and 8. The coil RL–2 is now energized by the first amplifier as long as sufficient light falls on the photoelectric cell 42.

Simultaneously the time-delay holding circuit of the coil RL–1 is interrupted between the contacts 9 and 10 and the input lead of the coil to terminal 7 is opened between contacts 12 and 13. The light relay LR is energized through the contacts 23, 24 and the diode $D_4$.

When the cars pass each other and no light falls on the photoelectric cell 42, the relay RL–2 is deenergized, the contacts return to the condition shown in FIG. 5, and the high beam filament HF is connected to the battery B′.

The photoelectric cells and the amplifier portions of the control circuits are arranged so as to actuate the light relay LR when an approaching vehicle using high beam headlights is about 300 meters away. The auxiliary headlight is then kept connected to its battery by the time-delay means illustrated in FIGS. 4 and 5 even if the approaching car dims its headlights.

Such dimming reduces the headlight brightness to approximately one tenth which however is sufficient to energize the second control circuit when the cars are close or about to pass each other, and thereby to interrupt the holding circuit of the first control relay.

Once the light relay LR has been switched from the high beam filament HF to the low beam filament LF, it remains in the dimming position even if the headlight intensity of the approaching car should vary. If the approaching car should turn off without passing, the high beam filament is switched on again after the charge of the capacitor $C_7$ has been dissipated, which may take 10 seconds, or the main headlight may be switched on manually by briefly moving the actuating member 46 of the switch assembly 45 in the direction of the arrow H.

The second control relay RL–2 is preferably of the quick-acting slowly releasing type. If the release time of the relay RL–2 is too short, I prefer to provide a time-delay holding means such as the capacitor $C_8$ with resistor $R_S$ shown in FIG. 4.

If the driver of the approaching car dims his headlight before the automatic headlight control system of the invention responds to the incident beam, the beam reduced in intensity to about one tenth of the normal value will not energize the first control circuit until the vehicles approach each other to about 100 meters. If the driver of the approaching car feels inconvenienced by the bright light of the high beam filament HF, he will signal by briefly switching his headlights to high intensity operation, and thereby automatically energize the light relay LR. The low beam filament LF is then kept connected to the battery B or B′.

If the approaching driver should fail to dim his lights after the first control circuit has automatically actuated the light relay LR, his attention may be attracted by moving the actuator 46 in the direction of the arrow H whereby the high beam filament HF is momentarily energized to give a light signal. The automatic headlight control system restores low beam filament operation as soon as the actuator 46 is released. The actuator 46 is preferably arranged near the steering wheel, for example, on the control handle for the directional or turn signals.

The automatic headlight control system of the invention may be adapted to the requirements of city driving and of driving through rural areas by adjusting the sensitivity of the control circuits and the angles from which the photoelectric cells receive light.

It is a specific feature of the headlight control systems of the invention that high beam filament operation is automatically restored after a predetermined period even if the approaching car should turn off the road without ever passing. The second time-delay means in the relay arrangement shown in FIG. 4 increases the reliability and response of the system even if the output current of the photoelectric cells should decay only with some time lag.

In the embodiment of the invention illustrated in FIG. 5, the second control circuit is arranged in such a manner as to open the holding circuit of the first relay RL–1 when light is received by the photoelectric cells 41 or 43. The circuit of the headlight filaments HL and FL, however, is at first not affected and the circuit energizing the light relay LR is merely switched from the contacts of the first control relay RL–1 to those of the second control relay RL–2. The latter is deenergized during passing of the cars or when the approaching car should turn off the road after coming very close. The automatic headlight control system of the invention incorporating the relay circuits shown in FIG. 5 is as reliable as that shown in FIG. 4.

It should be understood, of course, that the foregoing disclosure relates to only preferred embodiments of the invention and that it is intended to cover all changes and modifications of the examples of the invention herein chosen for the purpose of the disclosure which do not constitute departures from the spirit and scope of the invention set forth in the appended claims.

What I claim is:

1. A motor-vehicle headlight-control system responsive to an oncoming light beam from an approaching vehicle, comprising a main headlight, an auxiliary headlight, a source of electrical energy normally energizing said main headlight, first photosensitive detector means in the path of said oncoming light beam and actuable thereby, first circuit means energizable by said first detector means at a relatively low intensity of said beam for disconnecting said main headlight from said source and connecting said auxiliary headlight thereto, said first circuit means including time-delay means for disconnecting said auxiliary headlight from said source and connecting said main headlight thereto after a predetermined interval upon removal of said detector means from said path of said beam and a holding relay energizable by said first detector means while having switch-over contact means connected to said headlights and to said source, said holding relay having holding contact means in circuit with said time-delay means for maintaining said holding relay energized for the duration of said interval, and second photosensitive means actuable by said beam upon passage of said vehicle, and second circuit means energizable by said detector means at a relatively high intensity of said beam for de-energizing said holding relay, thereby disconnecting said source from said auxiliary headlight and reconnecting it to said main headlight while rendering said time-delay means inoperative.

2. A motor-vehicle headlight-control system responsive to an oncoming light beam from an approaching vehicle, comprising a main headlight, an auxiliary headlight, a source of electrical energy normally energizing said main headlight, first photosensitive detector means in the path of said oncoming light beam and actuable thereby, first circuit means energizable by said first detector means at a relatively low intensity of said beam for disconnecting said main headlight from said source and connecting said auxiliary headlight thereto, said first circuit means including time-delay means for disconnecting said auxiliary headlight from said source and connecting said main headlight thereto after a predetermined interval upon removal of said detector means from said path of said beam and a holding relay energizable by said first detector means while having switch-over contact means connected to said headlights and to said source, said holding relay having holding contact means in circuit with said time-delay means for maintaining said holding relay energized for the duration of said interval, and second photosensitive means actuable by said beam upon passage of said vehicle, and a further relay energizable by said detector means at a relatively high intensity of said beam, said further relay having further contact means connected in circuit with said holding contact means for de-energizing said holding relay, thereby disconnecting said source from said auxiliary headlight and reconnecting it to said main headlight while rendering said time-delay means inoperative.

3. A motor-vehicle headlight-control system responsive to an oncoming light beam from an approaching vehicle, comprising a main headlight, an auxiliary headlight, a source of electrical energy normally energizing said main headlight, first photosensitive detector means in the path of said oncoming light beam and actuable thereby, first circuit means energizable by said first detector means at a relatively low intensity of said beam for disconnecting said main headlight from said source and connecting said auxiliary headlight thereto, said first circuit means including a switch-over relay having switch-over contacts connected to said headlights and said source, time-delay means for disconnecting said auxiliary headlight from said source and connecting said main headlight thereto after a predetermined interval upon removal of said detector means from said path of said beam and a holding relay energizable by said first detector means while having other contact means connected in series with said switch-over relay and said source, said holding relay having holding contact means in circuit with said time-delay means for maintaining said holding relay energized for the duration of said interval, and second photosensitive means actuable by said beam upon passage of said vehicle, and a further relay energizable by said detector means at a relatively high intensity of said beam, said further relay having further contact means connected in circuit with said holding contact means for de-energizing said holding relay, thereby disconnecting said source from said auxiliary headlight and reconnecting it to said main headlight while rendering said time-delay means inoperative.

4. A motor vehicle headlight control system responsive to an oncoming light beam from an approaching vehicle, comprising:
 (a) a main headlight
 (b) an auxiliary headlight;
 (c) a source of electrical energy normally energizing said main headlight;
 (d) two photosensitive detector means in the path of said oncoming beam and sequentially actuable thereby;
 (e) first circuit means energizable by one of said detector means responsive to said beam for disconnecting said main headlight from said source and connecting said auxiliary headlight thereto;
 (f) holding circuit means including time-delay means for keeping said first circuit means energized for a predetermined interval, and
 (g) second circuit means energizable by the other detector means responsive to said beam after energization of said first circuit means for deenergizing said holding circuit means.

References Cited in the file of this patent
UNITED STATES PATENTS

| | | |
|---|---|---|
| 2,759,124 | Willis | Aug. 14, 1956 |
| 2,890,386 | Matkin et al. | June 9, 1959 |
| 2,931,944 | Admiraal et al. | Apr. 5, 1960 |
| 2,935,646 | Matkins | May 3, 1960 |